US011459945B1

(12) United States Patent
Himmelmann

(10) Patent No.: US 11,459,945 B1
(45) Date of Patent: Oct. 4, 2022

(54) MICRO-TURBINE GENERATOR MULTI-STAGE TURBINE WITH INTEGRATED REHEAT CYCLE

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/472,228

(22) Filed: Sep. 10, 2021

(51) Int. Cl.
*F02C 6/20* (2006.01)
*F02C 3/04* (2006.01)

(52) U.S. Cl.
CPC ............... *F02C 3/04* (2013.01); *F02C 6/20* (2013.01); *F05D 2220/76* (2013.01); *F05D 2240/35* (2013.01); *F05D 2240/60* (2013.01)

(58) Field of Classification Search
CPC .... F02C 3/04; F02C 6/003; F02C 6/20; F05D 2220/76; F05D 2240/35; F05D 2240/60
See application file for complete search history.

(56) References Cited

U.S. PATENT DOCUMENTS

| 2,511,385 | A | * | 6/1950 | Udale | ..................... F02C 6/003 60/774 |
|---|---|---|---|---|---|
| 7,600,382 | B2 | | 10/2009 | Ralls, Jr. | |
| 8,191,571 | B2 | | 6/2012 | Himmelmann et al. | |
| 9,708,977 | B2 | | 7/2017 | Woodall et al. | |
| 9,835,143 | B2 | | 12/2017 | Teixeira et al. | |
| 10,233,838 | B2 | | 3/2019 | Vick | |
| 10,774,747 | B2 | | 9/2020 | Taguchi et al. | |
| 2009/0133380 | A1 | * | 5/2009 | Donnerhack | ........... F02K 3/115 60/299 |
| 2015/0128557 | A1 | | 5/2015 | Del Campo | |
| 2018/0156122 | A1 | * | 6/2018 | Schwarz | ................. F02C 7/141 |
| 2019/0257247 | A1 | * | 8/2019 | Pal | ............................ F02C 7/18 |
| 2020/0348083 | A1 | | 11/2020 | Kornilov et al. | |

* cited by examiner

*Primary Examiner* — Steven M Sutherland
(74) *Attorney, Agent, or Firm* — Cantor Colburn LLP

(57) ABSTRACT

An electrical power generation system including a micro-turbine alternator. The micro-turbine alternator including a combustor, a first stage turbine configured to be driven by exhaust from the combustor, a second stage turbine configured to be driven by the exhaust from the combustor, at least one compressor operably connected to the combustor to provide a compressed airflow thereto, one or more shafts connecting the first stage turbine and the second stage turbine to the at least one compressor such that rotation of the first stage turbine and the second stage turbine drives rotation of the at least one compressor, and an exhaust turbine reheat cycle configured to transfer heat from the exhaust entering the first stage turbine to the exhaust entering the second stage turbine.

20 Claims, 4 Drawing Sheets

MICRO-TURBINE GENERATOR MULTI-STAGE TURBINE WITH INTEGRATED REHEAT CYCLE

BACKGROUND

Figure 1:
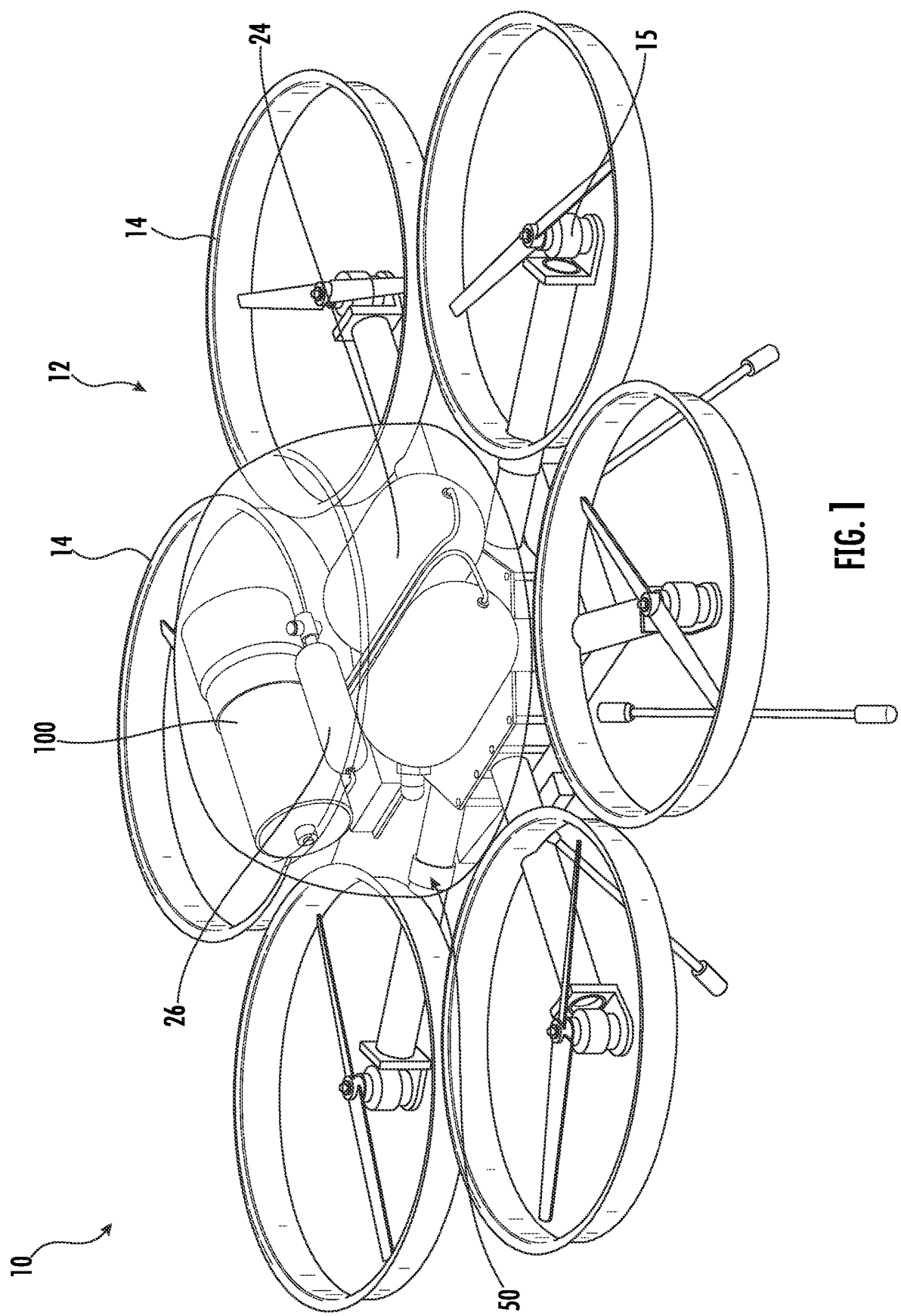

The embodiments herein generally relate to electrical power generation systems and more specifically, a multi-stage turbine reheat cycle for use in the electrical power generation system.

Some systems, such as unmanned aerial vehicles (UAV's) or the like often utilize electrical power for propulsion and operation of onboard systems. Some such systems, such as medium-sized UAV's that require power levels in the range of about 1 KW to 30 KW, have relatively short mission times because the energy density of batteries is far too low to effectively work in this power range, and conventional internal combustion engines and jet engines are very inefficient at these low power levels. One option that has been developed is a tethered UAV system in which the UAV is connected to a power source on the ground by a tether. Use of a tethered UAV allows for an increase in mission duration time, but reduces an operating height and distance in which the UAV may operate, due to the constraint of the tether. An untethered efficient power source that is lightweight with a high power density is greatly desired

BRIEF SUMMARY

According to one embodiment, an electrical power generation system is provided. The electrical power generation system including a micro-turbine alternator. The micro-turbine alternator including a combustor, a first stage turbine configured to be driven by exhaust from the combustor, a second stage turbine configured to be driven by the exhaust from the combustor, at least one compressor operably connected to the combustor to provide a compressed airflow thereto, one or more shafts connecting the first stage turbine and the second stage turbine to the at least one compressor such that rotation of the first stage turbine and the second stage turbine drives rotation of the at least one compressor, and an exhaust turbine reheat cycle configured to transfer heat from the exhaust entering the first stage turbine to the exhaust entering the second stage turbine.

In addition to one or more of the features described above, or as an alternative, further embodiments may include that the exhaust turbine reheat cycle further includes a heat exchanger including one or more heat rejection passageways, and one or more heat absorption passageways.

In addition to one or more of the features described above, or as an alternative, further embodiments may include that the exhaust turbine reheat cycle further includes a first passageway extending from the combustor to the one or more heat rejection passageways and fluidly connecting the combustor to the one or more heat rejection passageways.

In addition to one or more of the features described above, or as an alternative, further embodiments may include that the exhaust turbine reheat cycle further includes a second passageway extending from the one or more heat rejection passageways to the first stage turbine and fluidly connecting the one or more heat rejection passageways to the first stage turbine.

In addition to one or more of the features described above, or as an alternative, further embodiments may include that the exhaust turbine reheat cycle further includes a third passageway extending from the first stage turbine to the one or more heat absorption passageways and fluidly connecting the first stage turbine to the one or more heat absorption passageways.

In addition to one or more of the features described above, or as an alternative, further embodiments may include that the exhaust turbine reheat cycle further includes a fourth passageway extending from the one or more heat absorption passageways to the second stage turbine and fluidly connecting the one or more heat absorption passageways to the second stage turbine.

In addition to one or more of the features described above, or as an alternative, further embodiments may include that the exhaust turbine reheat cycle further includes a fifth passageway extending from the second stage turbine to a turbine of an auxiliary turbo charger and fluidly connecting the second stage turbine to the turbine.

In addition to one or more of the features described above, or as an alternative, further embodiments may include that the exhaust turbine reheat cycle further includes a second passageway extending from the one or more heat rejection passageways to the first stage turbine and fluidly connecting the one or more heat rejection passageways to the first stage turbine.

In addition to one or more of the features described above, or as an alternative, further embodiments may include that the exhaust turbine reheat cycle further includes a third passageway extending from the first stage turbine to the one or more heat absorption passageways and fluidly connecting the first stage turbine to the one or more heat absorption passageways.

In addition to one or more of the features described above, or as an alternative, further embodiments may include that the exhaust turbine reheat cycle further includes a fourth passageway extending from the one or more heat absorption passageways to the second stage turbine and fluidly connecting the one or more heat absorption passageways to the second stage turbine.

In addition to one or more of the features described above, or as an alternative, further embodiments may include that the exhaust turbine reheat cycle further includes a fifth passageway extending from the second stage turbine to a turbine of an auxiliary turbo charger and fluidly connecting the second stage turbine to the turbine.

In addition to one or more of the features described above, or as an alternative, further embodiments may include that the one or more heat absorption passageways are thermally connected to the one or more heat rejection passageways.

In addition to one or more of the features described above, or as an alternative, further embodiments may include that the one or more heat absorption passageways are physically connected to the one or more heat rejection passageways.

In addition to one or more of the features described above, or as an alternative, further embodiments may include that the at least one compressor further includes a first stage compressor, and a second stage compressor located aft of the first stage compressor, the first stage compressor and the second stage compressor being operably connected to the combustor to provide the compressed airflow thereto.

In addition to one or more of the features described above, or as an alternative, further embodiments may include an electric generator disposed along the one or more shafts such that electrical power is generated via rotation of the one or more shafts, wherein the electric generator is disposed along the one or more shafts between the first stage compressor and the second stage compressor.

In addition to one or more of the features described above, or as an alternative, further embodiments may include that at least one of the one or more shafts passes through the electric generator.

According to anther embodiment, a vehicle is provided. The vehicle including a propulsion system and an electrical power generation system operably connected to the propulsion system. The electrical power generation system including a micro-turbine alternator. The micro-turbine alternator including a combustor, a first stage turbine configured to be driven by exhaust from the combustor, a second stage turbine configured to be driven by the exhaust from the combustor, at least one compressor operably connected to the combustor to provide a compressed airflow thereto, one or more shafts connecting the first stage turbine and the second stage turbine to the at least one compressor such that rotation of the first stage turbine and the second stage turbine drives rotation of the at least one compressor, and an exhaust turbine reheat cycle configured to transfer heat from the exhaust entering the first stage turbine to the exhaust entering the second stage turbine.

In addition to one or more of the features described above, or as an alternative, further embodiments may include that the exhaust turbine reheat cycle further includes a heat exchanger including one or more heat rejection passageways and one or more heat absorption passageways.

In addition to one or more of the features described above, or as an alternative, further embodiments may include that the exhaust turbine reheat cycle further includes a first passageway extending from the combustor to the one or more heat rejection passageways and fluidly connecting the combustor to the one or more heat rejection passageways.

In addition to one or more of the features described above, or as an alternative, further embodiments may include that the exhaust turbine reheat cycle further includes a second passageway extending from the one or more heat rejection passageways to the first stage turbine and fluidly connecting the one or more heat rejection passageways to the first stage turbine.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
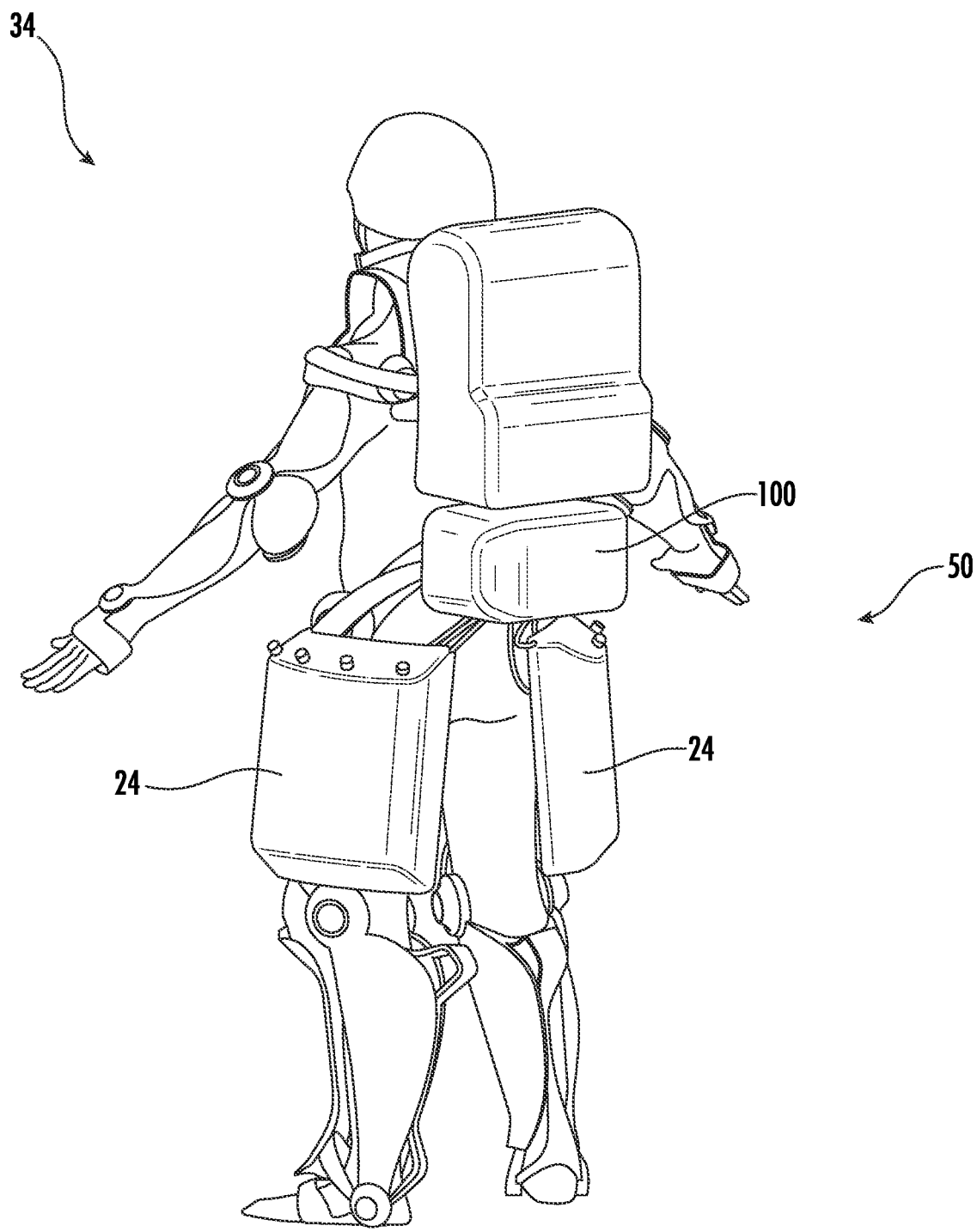
Figure 3:
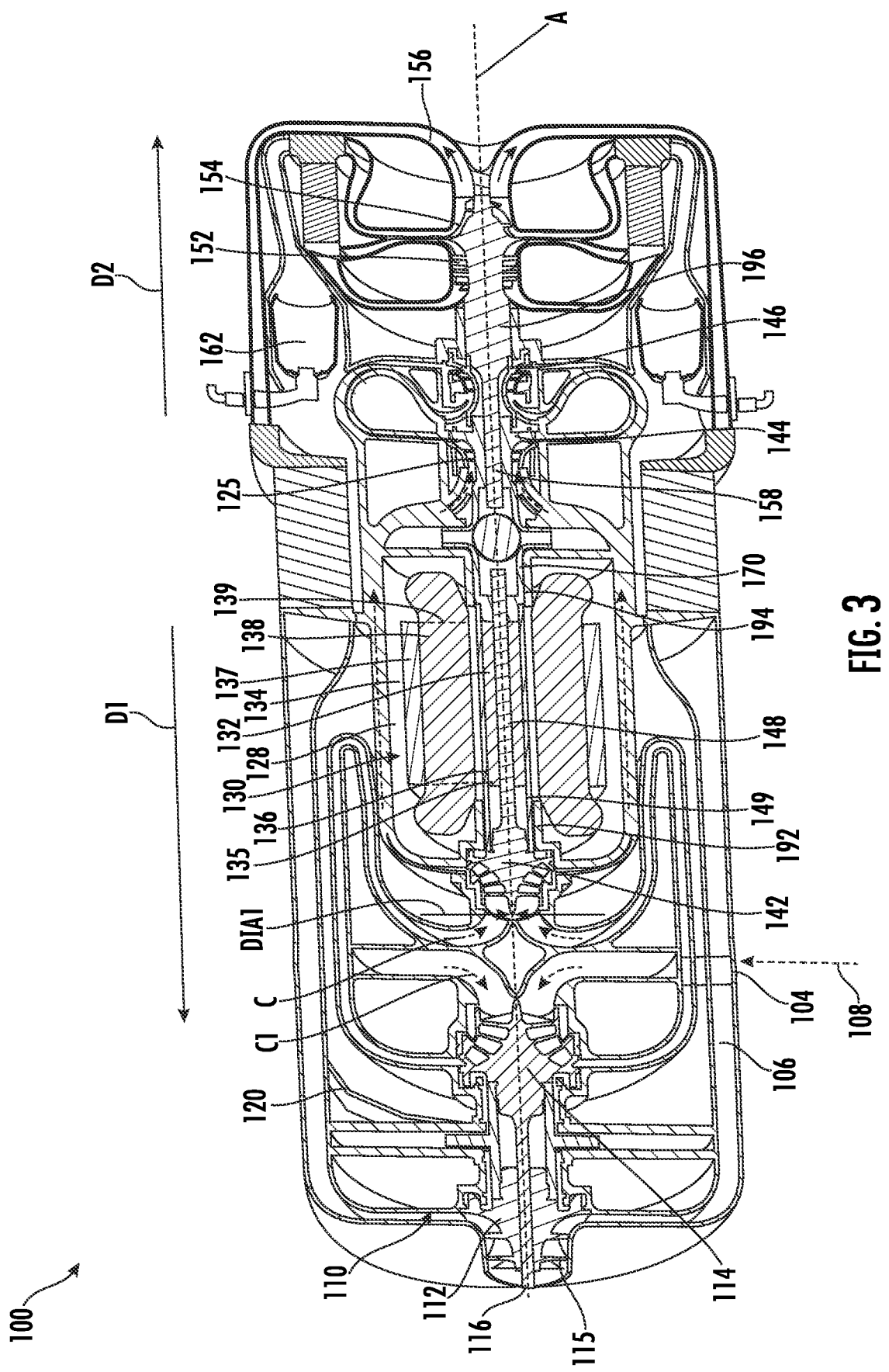
Figure 4:
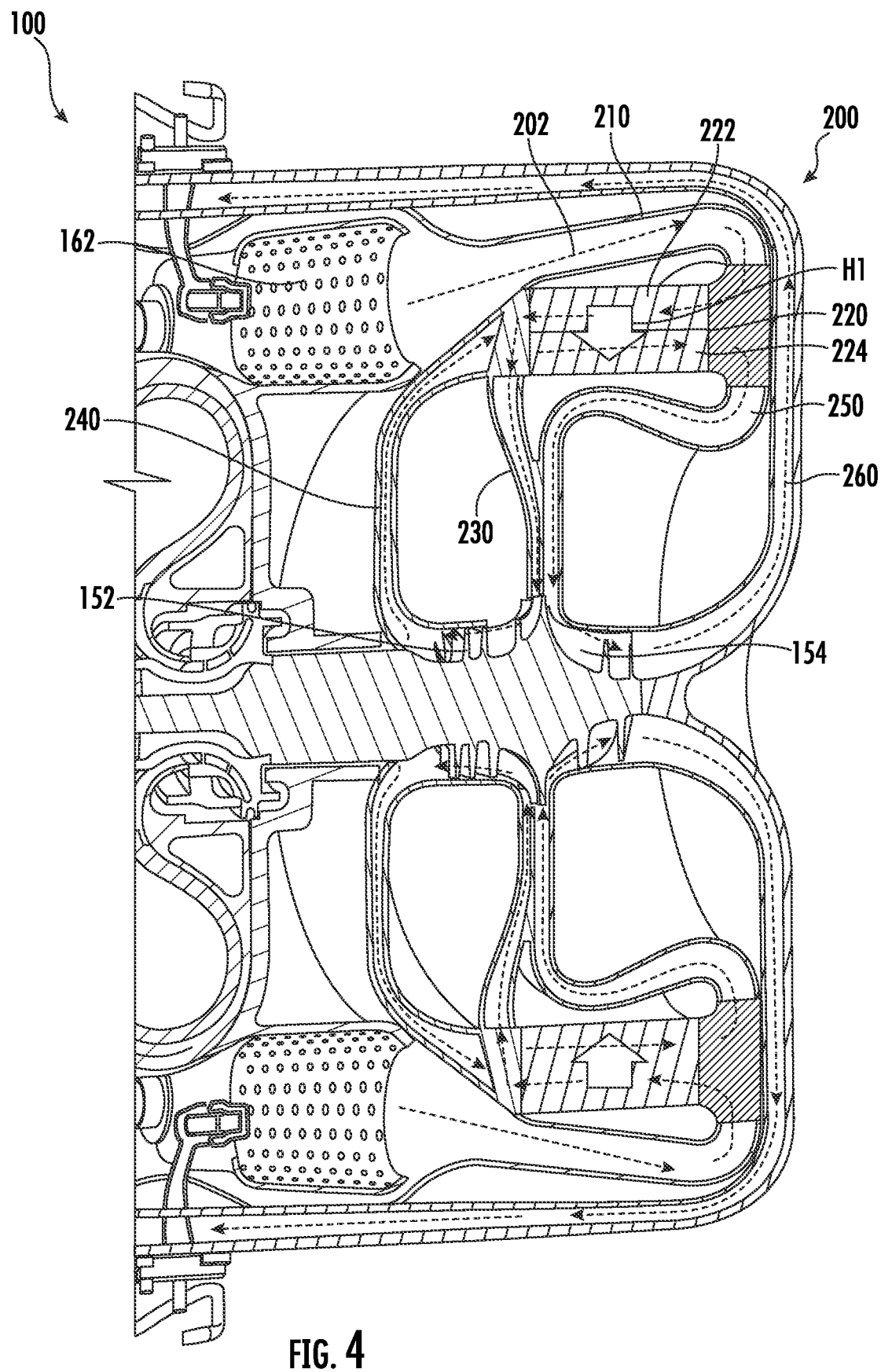

The following descriptions should not be considered limiting in any way. With reference to the accompanying drawings, like elements are numbered alike:

FIG. 1 is an isometric view of an unmanned aerial vehicle including a power generation system, according to an embodiment of the present disclosure;

FIG. 2 is an isometric view of a powered suit including a power generation system, according to an embodiment of the present disclosure; and FIG. 3 is an isometric cut-away view of a micro-turbine alternator for use in the power generation system of FIGS. 1 and 2, according to an embodiment of the present disclosure; and FIG. 4 is an enlarged isometric cut-away view of an exhaust turbine reheat cycle of the micro-turbine alternator of FIG. 3, according to an embodiment of the present disclosure.

DETAILED DESCRIPTION

A detailed description of one or more embodiments of the disclosed apparatus and method are presented herein by way of exemplification and not limitation with reference to the Figures.

As previously noted, an untethered, lightweight, high power density power source would allow systems like UAVs to have longer mission times without the height and distance limits of a tether. A prior approach to power generation involves micro-turbine alternator designs that places the electric generator at a forward end of a rotating shaft upstream of the compressor and turbine, which are then both located at an aft end of a rotating shaft. With this type of arrangement, the rotational speed of the compressor is limited by the compressor inlet relative velocity as the inlet diameter of the compress hub is increased to accommodate the rotating shaft that connects the compressor hub to the electric generator. Further, with this type of arrangement the compressor and turbine are overhung on the aft end of the rotating shaft, thus reducing the critical speed of the overall assembly. Embodiments disclosed herein relate to an interstage electric alternator for micro-turbine alternator applications. The micro-turbine alternator according to one or more embodiments may be used in a UAV or electrically-powered suit, as discussed for explanatory purposes, or any electrically-powered system. The design places an electric generator between two stages of the compressor to reduce the inlet diameter of the first stage compressor hub to as close to zero as possible so that the micro-turbine alternator may provide more power and operate with a lower inlet pressure.

Embodiments disclosed herein utilized a combustor to drive the turbine, rotating shaft, and compressor. Compressed air from the compressor is fed into the combustor and then fuel is added to the air and ignited.

In conventional combustor systems, with ignition the temperature of the air is raised up to a desired inlet temperature of a turbine. This compressed and heated air then enters the turbine inlet. The air enters the turbine at approximately a high temperature, which is near the thermal limit of the material used to manufacture the turbine. As the air passes through the turbine, it expands and cools, transferring energy to the turbine blades, causing the turbine to rotate. In a single stage turbine, the temperature of the air that leaves the turbine is still fairly high, resulting in energy leaving the engine, without doing useful work. This leads to a reduced engine efficiency.

Embodiments disclosed herein seek to make use of the aforementioned additional energy that left the engine. The embodiments disclosed herein accomplish this by utilizing a multi-stage turbine with an integrated re-heat cycle. Advantageously, using a two-stage turbine allows the engine to operate at higher rotational speeds, for a given power level. This is accomplished because the two smaller turbines are required to carry the torque that would normally be provided by a single, larger diameter turbine. The larger the diameter of a rotating machine, the larger the stresses are, for a given rotational speed. Creating the smaller diameter turbines allows the engine to operate at a higher rotational speed, for a given stress level.

Embodiments disclosed herein utilize a reheat cycle where heat is transferred from exhaust proximate to an inlet of the first stage turbine to exhaust proximate the inlet of a second stage turbine. Advantageously, this reduces the temperature of exhaust entering the first stage turbine, thus increasing the operating life of the first stage turbine. Also, advantageously, this increases the temperature of exhaust entering the second stage turbine, thus increasing the efficiency of the second stage turbine.

Referring to FIG. 1, an isometric view of an unmanned aerial vehicle (UAV) 10 is illustrated in accordance with an embodiment of the present disclosure. The UAV 10 includes a propulsion/lift system 12, for example a plurality of lift rotors 14, operably connected to an electrical power generation system 50, which includes a micro-turbine alternator system 100. In an embodiment, the micro-turbine alternator system 100 is a high efficiency Brayton cycle micro-turbine alternator. The UAV 10 includes a propulsion system having electric motors 15 and lift rotors 14 associated with each electric motor 15. Each lift rotor 14 is operably connected to the electric motor 15 that is configured to rotate the lift rotor 14 using electrical power generated by the micro-turbine alternator system 100 of the electrical power generation system 50. The micro-turbine alternator system 100 is configured to convert fuel to electrical power to power at least the electric motors 15 of the lift rotors 14. The fuel is provided from one or more fuel storage tanks 24 operably connected to the micro-turbine alternator system 100. In some embodiments, the fuel utilized is JP-8. The micro-turbine alternator system 100 may utilize compressed air provided from a compressed air tank 26 at 4500 psig and regulated to about 750 psig. The compressed air from the compressed air tank 26 of FIG. 1 may be utilized to provide the motive pressure required to drive the liquid fuel through a turbine speed control valve (not shown) and into a combustion chamber. Alternatively, an electric driven pump may be used in place of the compressed air.

Referring now to FIG. 2, with continued reference to FIG. 1, an isometric view of an electrically-powered suit 34 is illustrated in accordance with an embodiment of the present disclosure. While in FIG. 1, the micro-turbine alternator system 100 is described as utilized in a UAV 10, the micro-turbine alternator system 100 disclosed herein may be readily applied to other systems, and may be utilized in, for example, an electrically-powered suit 34, as shown in FIG. 2.

The electrically-powered suit 34 is operably connected to an electrical power generation system 50, which includes a micro-turbine alternator system 100. The micro-turbine alternator system 100 is configured to convert fuel to electrical power to power the electrically-powered suit 34. The fuel is provided from one or more fuel storage tanks 24 operably connected to the micro-turbine alternator system 100. In some embodiments, the fuel utilized is JP-8. The fuel storage tanks 24 may be located on legs of the electrically-powered suit 34, as illustrated in FIG. 2.

It is understood that the micro-turbine alternator system 100 is not limited to a UAV 10 and an electrically-powered suit 34 application, and the micro-turbine alternator system 100 may be applied to other systems not disclosed herein.

Referring now to FIG. 3, an isometric cut-away view of the micro-turbine alternator system 100 is illustrated, in accordance with an embodiment of the present disclosure. The micro-turbine alternator system 100 includes a first stage compressor 142, a second stage compressor 144, a third stage compressor 146, a first stage turbine 152, and a second stage turbine 154. The first stage compressor 142, the second stage compressor 144, the third stage compressor 146, the first stage turbine 152, and the second stage turbine 154 are oriented along a central longitudinal axis A of the micro-turbine alternator system 100. The micro-turbine alternator system 100 also includes an electric generator 130 located between the first stage compressor 142 and the second stage compressor 144 as measured along the central longitudinal axis A.

Advantageously, by locating the electric generator 130 between the first stage compressor 142 and the second stage compressor 144, the overall physical size of the micro-turbine alternator system 100 is reduced. As a result, the micro-turbine alternator system 100 according to one or more embodiments may be used in a UAV 10, an electrically-powered suit 34, or another system that benefits from untethered, lightweight power generation.

The micro-turbine alternator system 100 also includes an alternator stator cooling heat exchanger 128 configured to utilize airflow from the first stage compressor 142 to cool the electric generator 130. The alternator stator cooling heat exchanger 128 may encircle or enclose the electric generator 130 and may be configured to pass airflow from the first stage compressor 142 through or around the electric generator 130. Advantageously, by locating the electric generator 130 between the first stage compressor 142 and the second stage compressor 144, moderately cool air in the core flow path C from the first stage compressor 142 is forced through the alternator stator cooling heat exchanger 128 and heat may be drawn out of the electric generator 130 and to the airflow within the alternator stator cooling heat exchanger 128.

The electric generator 130 may be a permanent magnet alternator, an induction generator, a switched reluctance generator, a wound field generator, a hybrid generator, or any other type of alternator known to one of skill in the art. As illustrated in FIG. 3, the electric generator 130 may be a permanent magnet alternator that includes a rotor element 132 and a stator element 134 radially outward from the rotor element. In other words, the rotor element 132 is located radially inward from the stator element 134 as measured relative to the central longitudinal axis A. It is understood that the embodiments disclosed herein may be applicable to a rotor element 132 that is located radially outward from the stator element 134. The rotor element 132 may be rotated around the central longitudinal axis A to generate electricity.

The rotor element 132 includes an annular base member 135, an annular array of permanent magnets 136 that are respectively coupled to an outer diameter of the annular base member 135. The rotor element 132 may include a magnet retention band that fits over an outer diameter of the permanent magnet 136, and keeps the permanent magnet 136 on the rotating annular base member 135. In accordance with further embodiments, the stator element 134 includes a hub 137, a plurality of spokes 139 extending radially inward from the hub 137 and conductive elements 138 that are wound around the spokes 139 to form windings. When the rotor element 132 is rotated around the central longitudinal axis A a rotating flux field is generated by the permanent magnets 136 and this rotating flux field generates an alternating current in the conductive elements 138 to generate electricity for use by the UAV 10 of FIG. 1 or the electrically-powered suit 34 of FIG. 2.

The micro-turbine alternator system 100 includes a combustion chamber 162, in which a fuel-air mixture is combusted, with the combustion products utilized to drive an electric generator 130. In some embodiments, the fuel utilized in the combustion chamber 162 is JP-8. The micro-turbine alternator system 100 converts the energy of the combustion products into electrical power by urging the combustion products through the first stage turbine 152 and the second stage turbine 154, which are operably connected to and configured to rotate the rotor element 132 of the electric generator 130. The electrical energy generated by the electric generator 130 may then be rectified via a generator rectifier (not shown) and utilized by the propulsion/lift system 12 of FIG. 1 or the electrically-powered suit 34 of FIG. 2. The compressed air from the compressed air tank 26 of FIG. 1 may be utilized to provide the motive pressure required to drive the liquid fuel through a turbine speed control valve (not shown) and into the combustion chamber 162.

The first stage compressor 142 is located forward of the second stage compressor 144 and the third stage compressor 146 as measured along the central longitudinal axis A, and the second stage compressor 144 is located forward of the third stage compressor 146 as measured along the central longitudinal axis A. In other words, the second stage compressor 144 is located aft of the first stage compressor 142 and the third stage compressor 146 is located aft of the second stage compressor 144 as measured along the central longitudinal axis A. The forward direction D1 and the aft direction D2 are illustrated in FIG. 3. The first stage turbine 152 is located forward of the second stage turbine 154 as measured along the central longitudinal axis A. In other words, the second stage turbine 154 is located aft of the first stage turbine 152 as measured along the central longitudinal axis A. The first stage compressor 142, the second stage compressor 144, and the third stage compressor 146 are located forward of first stage turbine 152 and the second stage turbine 154 as measured along the central longitudinal axis A.

The micro-turbine alternator system 100 includes a compressor shaft 148 oriented along and co-axial to the central longitudinal axis A. In an embodiment, the compressor shaft 148 is a tie bolt and is used to compress a rotating group of components including the first stage compressor 142, compressor transfer tube 149, the compressor shaft 148, and a second journal bearing 194 in the axial direction, causing the multi-segment shaft to act as a single stiff shaft. The compressor shaft 148 may be attached or operably connected to the first stage compressor 142. The micro-turbine alternator system 100 includes a turbine shaft 158 oriented along and co-axial to the central longitudinal axis A. The turbine shaft 158 may be attached or operably connected to the first stage turbine 152 and the second stage turbine 154.

The micro-turbine alternator system 100 includes a coupling assembly 170 configured to operably connect the turbine shaft 158 to the compressor shaft 148. The coupling assembly 170 may be attached or operably connected to the second stage compressor 144. The compressor shaft 148 extends in the aft direction D2 away from the first stage compressor 142 and through the electric generator 130 to operably connect to the coupling assembly 170. In an embodiment, the compressor shaft 148 is located radially inward of the rotor element 132.

Advantageously, locating the electric generator 130 between the first stage compressor 142 and the second stage compressor 144 allows the first stage compressor 142 to have a reduced inlet hub diameter that is smaller than a diameter of the rotor element 132. Having a reduced inlet hub diameter DIA1 reduces the inlet flow relative velocity, increasing the aerodynamic performance of the first stage compressor 142 and increasing the swallowing capacity of the first stage compressor 142. If the electric generator 130 was located forward of the first stage compressor 142, then the compressor shaft 148 would have to extend forward of the first stage compressor 142 and thus the inlet hub diameter DIA1 would have to be increased to a diameter of the compressor shaft 148, thus decreasing the aerodynamic performance of the first stage compressor 142 and decreasing the swallowing capacity of the first stage compressor 142.

The turbine shaft 158 extends in the forward direction D1 away from the first stage turbine 152 to operably connect to the coupling assembly 170. The turbine shaft 158, the coupling assembly 170, and the compressor shaft 148 are configured to rotate in unison. Thus, when exhaust 102 from the combustion chamber 162 drives rotation of the first stage turbine 152 and the second stage turbine 154, the rotation of the first stage turbine 152 and the second stage turbine 154 drives rotation of the turbine shaft 158, which drives rotation of the coupling assembly 170 and the compressor shaft 148. The rotation of the compressor shaft 148 drives rotation of the first stage compressor 142. The rotation of the coupling assembly 170 drives rotation of the second stage compressor 144. The third stage compressor 146 is operably connected to the second stage compressor 144 and the turbine shaft 158, and thus rotation of the second stage compressor 144 and the turbine shaft 158 drives rotation of the third stage compressor 146.

It is understood that while the compressor shaft 148, the turbine shaft 158, and the coupling assembly 170 are described as three different shafts, the embodiments disclosed herein may be applicable to micro-turbine alternator system 100 having one or more shafts. In an embodiment, the electric generator 130 is disposed along the one or more shafts between the first stage compressor 142 and the second stage compressor 144. In another embodiment, the electric generator 130 is disposed along the compressor shaft 148 between the first stage compressor 142 and the second stage compressor 144. The electric generator 130 is located aft of the first stage compressor 142 and forward of the second stage compressor 144. In another embodiment, at least one of the one or more drive shafts passes through the electric generator 130. In another embodiment, the compressor shaft 148 passes through the electric generator 130.

The compressor shaft 148, the turbine shaft 158, and the coupling assembly 170 are coaxial and rotate via the bearing systems about the central longitudinal axis A, which is colinear with their longitudinal axes. The bearing system includes a first journal bearing 192 located between the compressor transfer tube 149 and the frame 106 of the micro-turbine alternator system 100. The bearing system includes a second journal bearing 194 located between the coupling assembly 170 and the frame 106 of the micro-turbine alternator system 100. The bearing system includes a third journal bearing 196 located between the turbine shaft 158 and the frame 106 of the micro-turbine alternator system 100.

Advantageously, locating the electric generator 130 between the first stage compressor 142 and the second stage compressor 144 provides for very effective bearing placement around the compressor shaft 148, which increases the stiffness of the compressor shaft 148. The increased stiffness of the compressor shaft 148 allows for an increase in the critical speed of the compressor shaft 148.

Also, advantageously, by locating the electric generator 130 between the first stage compressor 142 and the second stage compressor 144, the alternator stator cooling heat exchanger 128 helps reduce the operating temperature of the electric generator 130, while the airflow through the alternator stator cooling heat exchanger 128 also experiences a pressure drop. This pressure drop through the alternator stator cooling heat exchanger 128 forces some of the airflow from the first stage compressor 142 through the rotor element 132 and to a stator gap between the rotor element 132 and the stator element 134, which provides cooling air to the rotor element 132, the first journal bearing 192, and the second journal bearing 194.

The compressor transfer tube 149 extends from the first stage compressor 142 to the second stage compressor 144 through the electric generator 130. The compressor transfer tube 149 is co-axial with the electric generator 130. The rotor element 132 with the annular base member 135 and the annular array of permanent magnets 136 are located radially inward of the compressor transfer tube 149 measured relative to the central longitudinal axis A. The stator element 134 with the hub 137, the conductive elements 138, and the spokes 139 are located radially outward of the compressor transfer tube 149 measured relative to the central longitudinal axis A.

The first stage compressor 142, the second stage compressor 144, and the third stage compressor 146 drive air along a core flow path C for compression and communication in the combustion chamber 162. The airflow in the core flow path C is compressed by the first stage compressor 142, the second stage compressor 144, and the third stage compressor 146, is mixed with fuel and burned in the combustion chamber 162, and is then expanded over the first stage turbine 152 and the second stage turbine 154. The first stage turbine 152 and the second stage turbine 154 rotationally drive the turbine shaft 158 in response to the expansion. The combustion products are exhausted from the second stage turbine 154 through a turbine exit 156.

Each of the first stage compressor 142, the second stage compressor 144, the third stage compressor 146, the first stage turbine 152, and the second stage turbine 154 may include rows of rotor assemblies (shown schematically) that carry airfoils that extend into the core flow path C. For example, the rotor assemblies can carry a plurality of rotating blades 125. The blades 125 of the rotor assemblies create or extract energy (in the form of pressure) from the core airflow that is communicated through the micro-turbine alternator system 100 along the core flow path C.

The micro-turbine alternator system 100 may include an auxiliary turbo charger 110 to pre-compress the airflow 108 prior to entering the core flow path C. The auxiliary turbo charger 110 includes a turbo compressor 114 and a turbine 112 operably connected to the turbo compressor 114 through a turbo compressor drive shaft 116. The turbo compressor 114 is configured to rotate when the turbine 112 rotates.

The turbo compressor 114 is configured to pull external airflow 108 through one or more air inlets 104 in the frame 106 into a compressor flow path C1. The turbo compressor 114 is configured to compress the external airflow 108 in the compressor flow path C1 and deliver the airflow 108 to the first stage compressor 142 in the core airflow path C.

Each of the turbine 112 and the turbo compressor 114 may include rows of rotor assemblies (shown schematically) that carry airfoils that extend into the compressor flow path C1. For example, the rotor assemblies can carry a plurality of rotating blades 115. The blades 115 of the rotor assemblies for the turbine 112 extract energy (in the form of pressure and temperature) from the exhaust 102 that is communicated through the micro-turbine alternator system 100 along the core flow path C. The blades 115 of the rotor assemblies for the turbo compressor 114 create energy (in the form of pressure and temperature) from the airflow 108 that is communicated through the micro-turbine alternator system 100 along the compressor flow path C1.

Combustor exhaust 102 exiting the turbine exit 156 is directed to the turbine 112 of the auxiliary turbo charger 110. The exhaust 102 is then expanded over the turbine 112 of the auxiliary turbo charger 110. The turbine 112 rotationally drives the turbo compressor drive shaft 116 in response to the expansion. Rotation of the turbo compressor drive shaft 116 causes the turbo compressor 114 to rotate and compress the airflow 108 within the compressor flow path C1.

Some embodiments further include a thermal electric energy recovery system 120, configured to recover additional energy from exhaust 102 of the micro-turbine alternator system 100 before the exhaust 102 has flowed through the turbine 112 of the auxiliary turbo charger 110.

Referring now to FIG. 4, with continued reference to FIGS. 1-3, an enlarged isometric cut-away view of an exhaust turbine reheat cycle 200 of the micro-turbine alternator system 100 of FIG. 3 is illustrated, in accordance with an embodiment of the present disclosure. The exhaust turbine reheat cycle 200 is the path taken by the exhaust 202 exiting the combustor 162 through the first stage turbine 152 and the second stage turbine 154.

The exhaust turbine reheat cycle 200 includes a heat exchanger 220 configured to transfer heat H1 from exhaust 202 entering the first stage turbine 152 to exhaust 202 entering the second stage turbine 154, which advantageously helps increase the efficiency of the second stage turbine 154, while reducing the temperature of the exhaust 202 entering the first stage turbine 152. The reduction in the temperature of the exhaust 202 entering the first stage turbine 152 helps extended the life of the first stage turbine 152 by reducing an operating temperature of the first stage turbine 152. The second stage turbine 154 is located downstream of the first stage turbine 152 in a direction of exhaust 202 flow.

Exhaust 202 exits the combustor 162 via a first passageway 210. The first passageway 210 extends from the combustor 162 to the heat exchanger 220 and fluidly connects the combustor 162 to the heat exchanger 220. The heat exchanger 220 may be an air-to-air heat exchanger. The heat exchanger 220 includes one or more heat rejection passageways 222 and one or more heat absorption passageways 224. The one or more heat absorption passageways 224 are thermally connected to the one or more heat rejection passageways 222. The one or more heat absorption passageways 224 may be physically connected to the one or more heat rejection passageways 222. The heat exchanger 220 is configured to transfer heat H1 from the exhaust 202 in the one or more heat rejection passageways 222 to the exhaust 202 in the one or more heat absorption passageways 224.

Specifically, the first passageway 210 extends from the combustor 162 to the one or more heat rejection passageways 222 and fluidly connects the combustor 162 to the one or more heat rejection passageways 222. The exhaust 202 flows from the combustor 162 through the first passageway 210 and into the one or more heat rejection passageways 222.

The one or more heat rejection passageways 222 extend from the first passageway 210 to a second passageway 230 and fluidly connect the first passageway 210 to the second passageway 230. The exhaust 202 flows from the first passageway 210 through the one or more heat rejection passageways 222 and into second passageway 230.

The second passageway 230 extends from the one or more heat rejection passageways 222 to the first stage turbine 152 and fluidly connects the one or more heat rejection passageways 222 to the first stage turbine 152. The exhaust 202 flows from the one or more heat rejection passageways 222 through the second passageway 230 and into the first stage turbine 152.

The first stage turbine 152 extends from the second passageway 230 to a third passageway 240 and fluidly connects the second passageways 230 to the third passageway 240. The exhaust 202 flows from the second passageway through the first stage turbine 152 and into the third passageway 240.

The third passageway 240 extends from the first stage turbine 152 to the one or more heat absorption passageways 224 and fluidly connects the first stage turbine 152 to the one or more heat absorption passageways 224. The exhaust 202 flows from the first stage turbine 152 through the third passageway 240 and into the one or more heat absorption passageways 224.

The one or more heat absorption passageways 224 extend from the third passageway 240 to a fourth passageway 250 and fluidly connects the third passageway 240 to the fourth passageway 250. The exhaust 202 flows from the third passageway 240 through the one or more heat absorption passageways 224 and into the fourth passageway 250. Heat H1 is transferred to the exhaust 202 in the one or more heat absorption passageways 224 from the one or more heat rejection passageways 222.

The fourth passageway 250 extends from the one or more heat absorption passageways 224 to the second stage turbine 154 and fluidly connects the one or more heat absorption passageways 224 to the second stage turbine 154. The exhaust 202 flows from the one or more heat absorption passageways 224 through the fourth passageway 250 and into the second stage turbine 154.

The second stage turbine 154 extends from the fourth passageway 250 to a fifth passageway 260 and fluidly connects the fourth passageway 250 to the fifth passageway 260. The exhaust 202 flows from the fourth passageway 250 through the second stage turbine 154 and into the fifth passageway 260.

The fifth passageway 260 extends from the second stage turbine 154 to the turbine 112 of the auxiliary turbo charger 110 (see FIG. 3) and fluidly connects the second stage turbine 154 to the turbine 112. The exhaust 202 flows from the second stage turbine 154 through the fifth passageway 260 and into the turbine 112 of the auxiliary turbo charger 110.

In one non-limiting example, a temperature of the exhaust 202 may be at a first temperature in the first passageway 210, a second temperature in the second passageway 230, a third temperature in the third passageway 240, a fourth temperature in the fourth passageway 250, and a fifth temperature in the fifth passageway 260. The second temperature may be less than the first temperature, the third temperature may be less than the second temperature, the fourth temperature may be equivalent to the second temperature, and the fifth temperature may be less than the third temperature.

Technical effects and benefits of the features described herein include heating exhaust flowing into an inlet of a second stage turbine using exhaust flow into an inlet of a first stage turbine to increase the efficiency of the second stage turbine while extending the life of the first stage turbine by reducing its operating temperature.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electrical power generation system, comprising:
   a micro-turbine alternator, comprising:
      a combustor;
      a first stage turbine configured to be driven by exhaust from the combustor;
      a second stage turbine configured to be driven by the exhaust from the combustor;
      at least one compressor operably connected to the combustor to provide a compressed airflow thereto;
      one or more shafts connecting the first stage turbine and the second stage turbine to the at least one compressor such that rotation of the first stage turbine and the second stage turbine drives rotation of the at least one compressor; and
      an exhaust turbine reheat cycle configured to transfer heat from the exhaust entering the first stage turbine to the exhaust entering the second stage turbine.

2. The electrical power generation system of claim 1, wherein the exhaust turbine reheat cycle further comprises:
   a heat exchanger comprising:
      one or more heat rejection passageways; and
      one or more heat absorption passageways.

3. The electrical power generation system of claim 2, wherein the exhaust turbine reheat cycle further comprises:
   a first passageway extending from the combustor to the one or more heat rejection passageways and fluidly connecting the combustor to the one or more heat rejection passageways.

4. The electrical power generation system of claim 3, wherein the exhaust turbine reheat cycle further comprises:
   a second passageway extending from the one or more heat rejection passageways to the first stage turbine and fluidly connecting the one or more heat rejection passageways to the first stage turbine.

5. The electrical power generation system of claim 4, wherein the exhaust turbine reheat cycle further comprises:
   a third passageway extending from the first stage turbine to the one or more heat absorption passageways and fluidly connecting the first stage turbine to the one or more heat absorption passageways.

6. The electrical power generation system of claim 5, wherein the exhaust turbine reheat cycle further comprises:
   a fourth passageway extending from the one or more heat absorption passageways to the second stage turbine and fluidly connecting the one or more heat absorption passageways to the second stage turbine.

7. The electrical power generation system of claim 6, wherein the exhaust turbine reheat cycle further comprises:
a fifth passageway extending from the second stage turbine to a turbine of an auxiliary turbo charger and fluidly connecting the second stage turbine to the turbine.

8. The electrical power generation system of claim 2, wherein the exhaust turbine reheat cycle further comprises:
a second passageway extending from the one or more heat rejection passageways to the first stage turbine and fluidly connecting the one or more heat rejection passageways to the first stage turbine.

9. The electrical power generation system of claim 2, wherein the exhaust turbine reheat cycle further comprises:
a third passageway extending from the first stage turbine to the one or more heat absorption passageways and fluidly connecting the first stage turbine to the one or more heat absorption passageways.

10. The electrical power generation system of claim 2, wherein the exhaust turbine reheat cycle further comprises:
a fourth passageway extending from the one or more heat absorption passageways to the second stage turbine and fluidly connecting the one or more heat absorption passageways to the second stage turbine.

11. The electrical power generation system of claim 2, wherein the exhaust turbine reheat cycle further comprises:
a fifth passageway extending from the second stage turbine to a turbine of an auxiliary turbo charger and fluidly connecting the second stage turbine to the turbine.

12. The electrical power generation system of claim 2, wherein the one or more heat absorption passageways are thermally connected to the one or more heat rejection passageways.

13. The electrical power generation system of claim 2, wherein the one or more heat absorption passageways are physically connected to the one or more heat rejection passageways.

14. The electrical power generation system of claim 1, wherein the at least one compressor further comprises:
a first stage compressor; and
a second stage compressor located aft of the first stage compressor, the first stage compressor and the second stage compressor being operably connected to the combustor to provide the compressed airflow thereto.

15. The electrical power generation system of claim 1, further comprising:
an electric generator disposed along the one or more shafts such that electrical power is generated via rotation of the one or more shafts, wherein the electric generator is disposed along the one or more shafts between the first stage compressor and the second stage compressor.

16. The electrical power generation system of claim 15, wherein at least one of the one or more shafts passes through the electric generator.

17. A vehicle, comprising:
a propulsion system; and
an electrical power generation system operably connected to the propulsion system, comprising:
a micro-turbine alternator, comprising:
a combustor;
a first stage turbine configured to be driven by exhaust from the combustor;
a second stage turbine configured to be driven by the exhaust from the combustor;
at least one compressor operably connected to the combustor to provide a compressed airflow thereto;
one or more shafts connecting the first stage turbine and the second stage turbine to the at least one compressor such that rotation of the first stage turbine and the second stage turbine drives rotation of the at least one compressor; and
an exhaust turbine reheat cycle configured to transfer heat from the exhaust entering the first stage turbine to the exhaust entering the second stage turbine.

18. The vehicle of claim 17, wherein the exhaust turbine reheat cycle further comprises:
a heat exchanger comprising:
one or more heat rejection passageways; and
one or more heat absorption passageways.

19. The vehicle of claim 18, wherein the exhaust turbine reheat cycle further comprises:
a first passageway extending from the combustor to the one or more heat rejection passageways and fluidly connecting the combustor to the one or more heat rejection passageways.

20. The vehicle of claim 19, wherein the exhaust turbine reheat cycle further comprises:
a second passageway extending from the one or more heat rejection passageways to the first stage turbine and fluidly connecting the one or more heat rejection passageways to the first stage turbine.

\* \* \* \* \*